March 3, 1959  K. HUSO  2,875,640
MEANS FOR LOCKING A TRANSMISSION SELECTOR LEVER
IN DRIVE SHAFT LOCKING OR PARKING POSITION
Filed Oct. 24, 1956  2 Sheets-Sheet 2

INVENTOR
Kenneth Huso
BY Lowry & Rinehart
ATTORNEYS

United States Patent Office 2,875,640
Patented Mar. 3, 1959

2,875,640

MEANS FOR LOCKING A TRANSMISSION SELECTOR LEVER IN DRIVE SHAFT LOCKING OR PARKING POSITION

Kenneth Huso, Minneota, Minn.

Application October 24, 1956, Serial No. 618,130

6 Claims. (Cl. 74—529)

In most automobiles equipped with automatic transmissions, the manufacturers have provided a drive shaft lock which is more positive than the usual hand brake and much easier to operate, as the driver merely has to move the gear selector lever to parking position. However, this ease of application also means ease of release. Thus, a child left in the car may move the selector lever from its parking position or an adult may accidentally do the same thing, possibly with disastrous results.

The present invention is designed to prevent such occurrences by providing for automatically latching the elements actuated by the selector lever in drive shaft locking or parking position, whenever moved to this position by operation of the selector lever.

A further object is to provide novel releasing means for the latching means, said releasing means being operable by pressure on the usual brake pedal, thus providing for latch release when the driver steps on the brake while shifting the selector lever for forward or rearward propulsion of the car, as customary.

A still further object is to provide a simple, inexpensive and easily installed attachment for attaining the desired ends.

With the above and other objects in view that will become apparent as the nature of the invention is better understood, the same consists in the novel form, combination and arrangement of parts hereinafter more fully described, shown in the accompanying drawings and particularly pointed out in the appended claims.

In the drawings:

Fig. 4 is a fragmentary side elevation showing the shape of the latch arm more accurately than this shape could be shown in perspective views;

Fig. 5 is a sectional view on line 5—5 of Fig. 4;

Fig. 6 is a perspective view of a mounting bracket for the rod which carries the latch arm; and Fig. 7 is a top plan view, partly in section, showing a modified fitting which could be employed for connecting the aforesaid rod with the brake pedal.

The invention has been illustratively disclosed in one embodiment for attachment to one make of automobile, but it is to be understood that variations adapting it for other cars could well be made.

Figure 1:
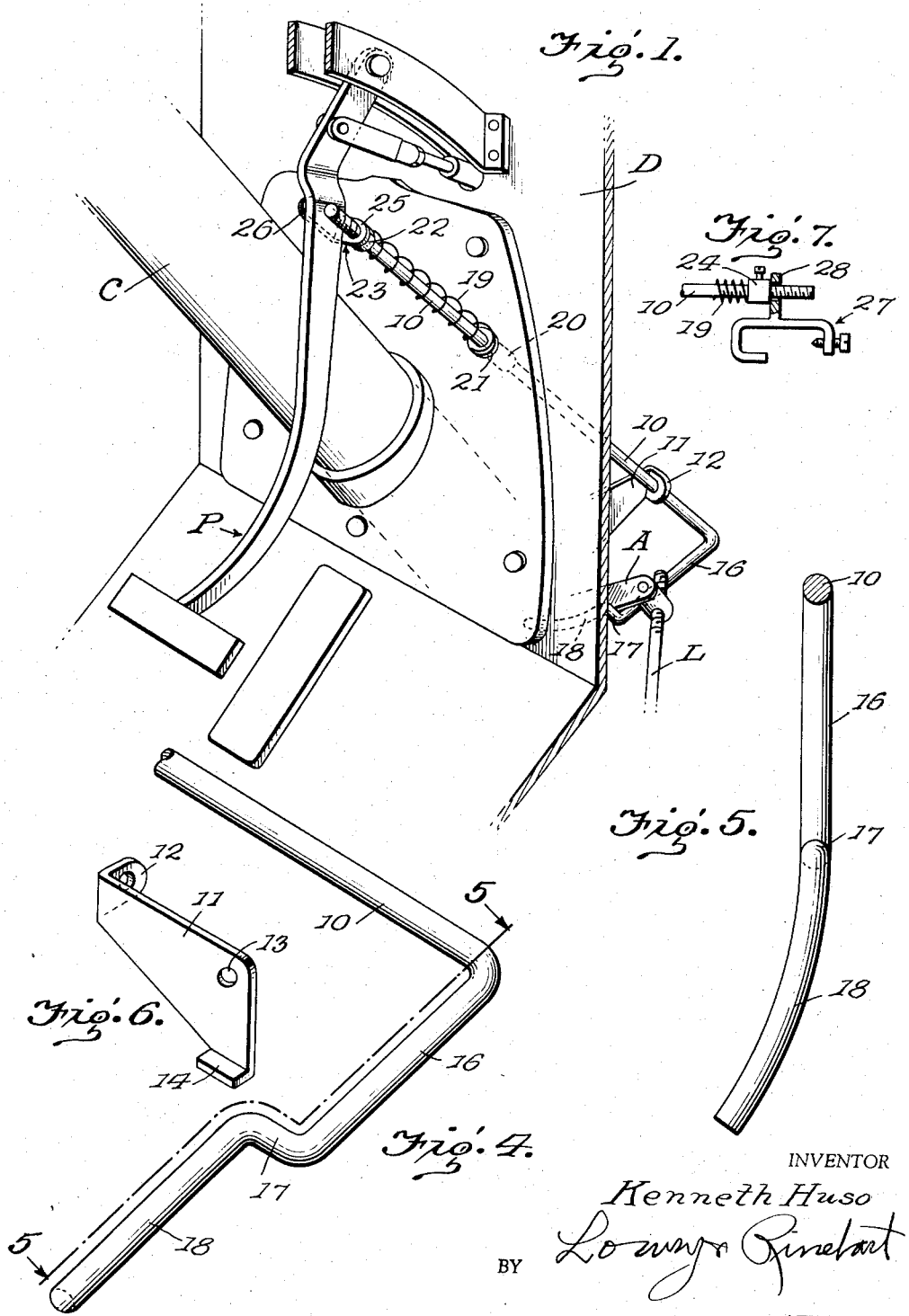
Fig. 1 is a fragmentary perspective view looking diagonally forward at the dash of an automobile, the steering column and the brake pedal, showing the invention installed and in position for latching an arm of the transmission control linkage in its drive shaft locking or parking position.
Figure 3:
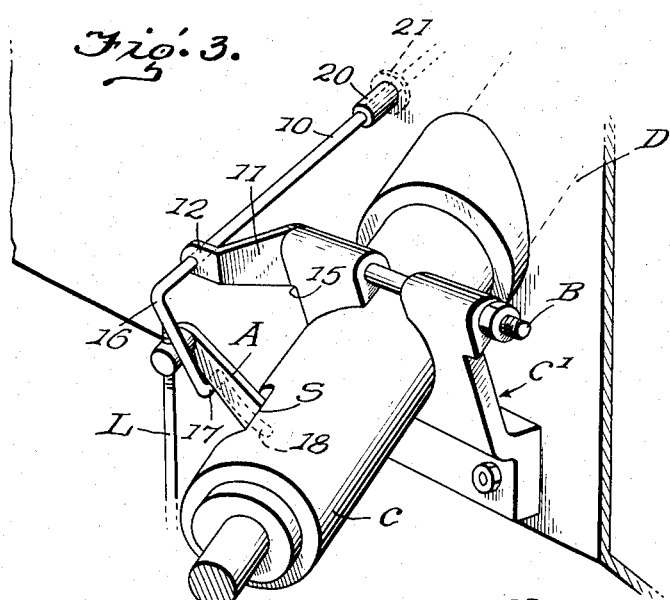
Fig. 3 is a view similar to Fig. 2 but showing the arm latched in its drive shaft locking or parking position.

In the drawings, a portion of an automobile dash is shown at D, the steering column at C, the steering column clamp at C¹, the clamp bolt at B, and the brake pedal at P. A transmission control arm A projects through a slot S near the front end of the steering column C and is connected to the usual transmission controlling linkage, one link of which is shown at L. The arm A is vertically swingable by means of the customary selector lever (not shown) and in addition to being movable to neutral, low gear and drive positions, said arm A is swingable to an extreme raised or parked position as shown in Figs. 1 and 3 in which it applies a known lock for the drive shaft of the car. In the present embodiment of the invention, the latch means coacts with the arm A to hold it in drive shaft locking or parking position, but in other embodiments of the invention to adapt it to other cars, it could well coact with some other suitable member to attain the same result. In any form of the invention provision is made whereby operation of the brake pedal P releases the latch means.

In the disclosed form of the invention, a rod 10 is provided to extend through an opening in the dash D with its front end portion upwardly spaced from the arm A. A bracket 11 is provided with a lateral guide 12 for the rod 10, said bracket 11 having an opening 13 (Fig. 6) to receive the bolt B of the steering column clamp C¹. The bracket 11 is provided also with a lug 14 to engage the usual shoulder 15 on the clamp C¹ to prevent possible pivotal movement of said bracket. The front end portion of the rod 10 is bent laterally downward to form a latch arm 16 for location in front of the arm A. At the lower end of the latch arm 16, the rod is bent rearwardly to form an upwardly facing shoulder 17 and the rod is extended downwardly at 18 to lie against the front side of the arm A when this arm is in position except its fully raised, drive shaft locking or parking position. The shoulder 17 is so located, however, as to be rearwardly movable under the arm A (see Figs. 1 and 3) when this arm is upwardly swung to said fully raised position. To cause this rearward movement of the shoulder 17, a spring 19 (Fig. 1) is provided around the rod 10. This spring constantly biases the rod 10 rearwardly, normally holds the latch arm extension 18 against the front side of the arm A and stands in readiness to engage the shoulder 17 with said arm A when the latter is fully raised.

The rod 10, while substantially unidirectional with the steering column C, preferably upwardly diverges forwardly from said steering column. Therefore, the latch arm 16 and its extension 18 are shown at an acute angle to the rod 10 to bring them into a plane parallel with the plane in which the arm A is swingable and thus the movements of the arm A into neutral, low gear and drive position will cause no longitudinal movement of said rod. The extension 18 is preferably curved on an arc about the center upon which the arm A swings.

A guide sleeve 20 preferably surrounds the rod 10 to extend through an opening formed through the dash D. The rear end of this sleeve has a flange 21 to abut the dash and to receive the forward thrust of the spring 19. In Fig. 1 of the present disclosure, the rearward thrust of the spring 19 is transmitted to the rod 10 through the medium of a lock 22 (Fig. 1) which locks a fitting 23 in adjusted position on the rear end of the rod 10. In Fig. 7, however, the spring 19 abuts a collar 24 adjustably secured on the rod 10.

The fitting 23 is in the form of an L-shaped member having one of its arms 25 threaded onto the rod 10 at a point in advance of the rear extremity of said rod. The other arm 26 of the L-shaped member is laterally spaced from the portion of the rod 10 which projects rearwardly from the arm 25. This rearwardly projecting rod portion and the arm 26 straddle the brake pedal P; and the arm 25 is then in the forward path of said pedal to transmit movement from the latter to the rod 10 for the purpose of releasing the shoulder 17 from the arm A.

In Fig. 7 a clamp 27 is provided to engage the pedal P. This clamp has a lateral apertured lug 28 through which the rear end of the rod 10 passes. This lug 28 abuts the collar 24 to transmit latch releasing movement to the rod 10 when the pedal P is operated.

Operation

Figure 2:
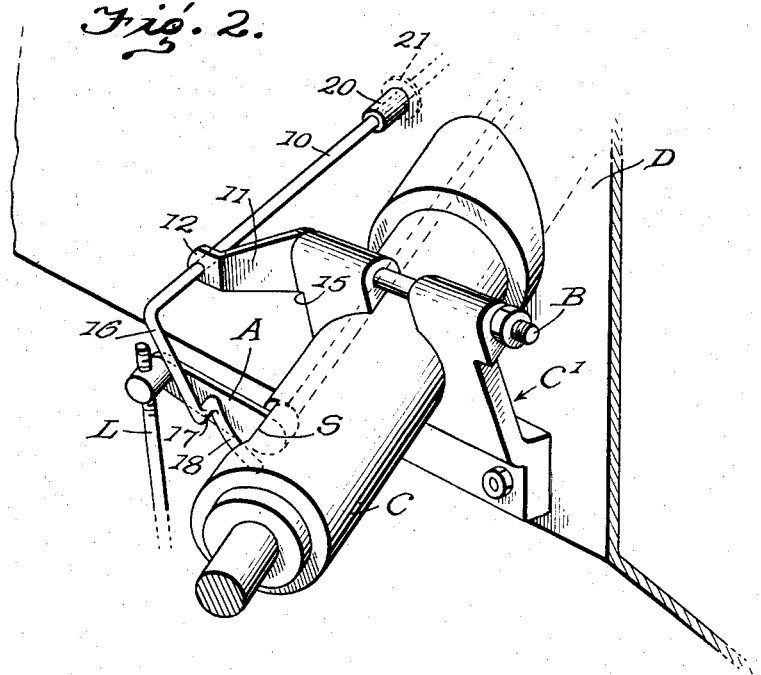
Fig. 2 is a fragmentary perspective view looking diagonally rearward at the dash and steering column and the installed invention, the latching means for the aforesaid arm being shown in released position.

During all movements of the arm A while driving, the rod 10, latch arm 16, and shoulder 17 are held against rearward movement by contact of the extension 18 with the front side of said arm A as shown in Fig. 2. As soon as the car is parked and the usual selector lever is moved to parking position, the arm A moves upwardly to the fully raised position of Figs. 1 and 3. This moves the drive shaft lock into effective position and at the same time the spring 19 shifts the rod 10 rearwardly. This positions the shoulder 17 under the arm A (Figs. 1 and 3) and the latch arm 16 then abuts said arm A. Consequently, the selector lever cannot be intentionally or accidentally moved from its drive shaft locking position by mere pressure against said selector lever and neither a child nor an adult left in the parked car, can released the drive shaft locking means by such pressure. A hazard to car occupants and others is thus eliminated. When the driver wishes to proceed, he naturally applies the foot brake before moving the selector lever to the position in which he wishes it to be. This brake application causes the pedal P to forwardly slide the rod 10, moving the shoulder 17 away from the arm A and permitting movement of the selector lever as desired. Movement of this lever from its parking position disposes the latch extension 18 in front of the arm A and this arm then prohibits rearward movement of the rod 10 until the car is again to be parked.

From the foregoing, it will be seen that novel and advantageous provision has been made for attaining the desired ends, and while there is herein shown and described the preferred embodiment of the invention, it is nevertheless to be understood that minor changes may be made therein without departing from the spirit and scope of the invention as claimed.

I claim:

1. In an automobile having a transmission control member movable to a drive shaft locking position, and a brake pedal; self-applied latch means mounted in position to engage and hold said control member when the latter is moved to said drive shaft locking position, and releasing means for said latch means operable by means of said brake pedal, said latch means comprising a slidably mounted rod having a lateral latch arm on its front end, said latch arm being disposed in front of said control member, and a spring acting on said rod to move the same rearwardly to engage said latch arm with said control member; the rear end of said rod being connected to said brake pedal, said latch arm having an extension to lie against the front side of said control member when the latter occupies other positions, to thereby prevent said spring from rearwardly sliding said rod until said control member is moved to said transmission locking position.

2. In an automobile having a steering column, a swingable transmission control arm near the lower end of said steering column and movable to a drive shaft locking position, and a brake pedal; self-applied latch means mounted in position to engage and hold said arm when the latter is moved to said drive shaft locking position, releasing means for said latch means, said releasing means being operatively connected with said latch means and with said brake pedal and being operable by means of the latter to release said latch means, said latch means comprising a slidably mounted rod over said control arm and extending substantially longitudinally of said steering column, said rod having a depending latch arm at its front end, said latch arm being disposed in front of said control arm, and a spring acting on said rod to move the same rearwardly to engage said latch arm with said control arm; the rear end of said rod being connected to said brake pedal.

3. In an automobile having a steering column, a swingable transmission control arm near the lower end of said steering column and movable to a drive shaft locking position, and a brake pedal; self-applied latch means mounted in position to engage and hold said arm when the latter is moved to said drive shaft locking position, releasing means for said latch means, said releasing means being operatively connected with said latch means and with said brake pedal and being operable by means of the latter to release said latch means, said latch means comprising a slidably mounted rod over said control arm and extending substantially longitudinally of said steering column, said rod having a depending latch arm at its front end, said latch arm being disposed in front of said control arm, and a spring acting on said rod to move the same rearwardly to engage said latch arm with said control arm; the rear end of said rod being connected to said brake pedal, said latch arm having an extension to lie against the front side of said control arm when the latter occupies other positions, to thereby prevent said spring from rearwardly sliding said rod until said control arm is moved to said transmission locking position.

4. An attachment for an automobile having a steering column extending through a dash, a steering column clamp in advance of said dash, a vertically swingable transmission control arm in advance of said clamp and projecting laterally from said steering column, and a brake pedal behind said dash, said control arm being upwardly swingable to a drive shaft locking position; said attachment comprising a bracket for mounting on the steering column by means of a conventional bolt thereof, said bracket having a rod guide, a rod extending slidably through said rod guide and adapted to extend through an opening in the dash, said rod having a downwardly projecting latch arm to extend in front of the transmission control arm, said latch arm having a rearwardly projecting upwardly facing shoulder to move rearwardly under the control arm when the latter is swung upwardly to drive shaft locking position, said latch arm also having an extension projecting downwardly at the rear end of said shoulder and adapted to lie against the front side of the control arm when the latter occupies lowered positions, a spring surrounding a portion of said rod to thrust against the dash and bias said rod rearwardly, and a fitting on the rear end of said rod engageable with the brake pedal; whereby operation of this pedal will forwardly slide said rod to free said shoulder from the control arm.

5. A structure as specified in claim 4; together with a sleeve on said rod to extend through the dash opening, the rear end of said sleeve having a flange to abut the dash and to receive the thrust of said spring.

6. A structure as specified in claim 4; said fitting comprising an L-shaped member having one of its arms threaded onto said rod in advance of the rear extremity of the latter, the other arm of said L-shaped member being laterally spaced from said rod and projecting rearwardly, the brake pedal being receivable between said rearwardly projecting arm and the rear portion of said rod.

References Cited in the file of this patent

UNITED STATES PATENTS

| | | |
|---|---|---|
| 1,230,426 | Murray | June 19, 1917 |
| 1,662,211 | Shier | Mar. 13, 1928 |
| 1,906,571 | Gilmore | May 2, 1933 |
| 2,309,051 | Dodge | Jan. 19, 1943 |
| 2,550,403 | Carmichael | Apr. 24, 1951 |
| 2,722,135 | Taylor | Nov. 1, 1955 |

FOREIGN PATENTS

| | | |
|---|---|---|
| 1,107,083 | France | Aug. 3, 1955 |